(12) United States Patent
Scarbo et al.

(10) Patent No.: US 8,276,693 B2
(45) Date of Patent: Oct. 2, 2012

(54) POWERTRAIN, VEHICLE, AND METHOD WITH ELECTRIC MOTORS AND DUAL BELT DRIVE

(75) Inventors: Joseph N. Scarbo, Rancho Santa Margarita, CA (US); Derk Hartland, Lake Forest, CA (US); Russel L. Wicks, Costa Mesa, CA (US); Neil E. Hannemann, Oceanside, CA (US)

(73) Assignee: American Challenge Technologies, Inc., Beverly Hills, CA (US)

( * ) Notice: Subject to any disclaimer, the term of this patent is extended or adjusted under 35 U.S.C. 154(b) by 0 days.

(21) Appl. No.: 13/028,954

(22) Filed: Feb. 16, 2011

(65) Prior Publication Data
US 2012/0052995 A1      Mar. 1, 2012

(51) Int. Cl.
*B60K 1/02*      (2006.01)
(52) U.S. Cl. ..................... 180/65.1; 903/903
(58) Field of Classification Search .......... 180/65.1, 180/65.21, 65.22, 65.31, 65.51, 65.6, 907; 474/86; 903/903
See application file for complete search history.

(56) References Cited

U.S. PATENT DOCUMENTS

| | | | |
|---|---|---|---|
| 3,521,722 A * | 7/1970 | Dimonte | 180/65.1 |
| 3,575,250 A * | 4/1971 | Dykes | 180/11 |
| 3,915,251 A * | 10/1975 | Kassekert et al. | 180/65.1 |
| 3,983,952 A * | 10/1976 | McKee | 280/778 |
| 4,366,880 A | 1/1983 | Miller et al. | |
| 5,253,724 A * | 10/1993 | Prior | 180/6.5 |
| D344,255 S | 2/1994 | Optiz | |
| 5,469,930 A | 11/1995 | Wiers | |
| 5,960,901 A * | 10/1999 | Hanagan | 180/210 |
| 6,241,040 B1 | 6/2001 | Schanz et al. | |
| 6,375,209 B1 * | 4/2002 | Schlangen | 280/250.1 |
| 6,398,679 B1 | 6/2002 | Brown | |
| 6,886,647 B1 * | 5/2005 | Gotta | 180/65.1 |
| 7,114,585 B2 | 10/2006 | Man et al. | |
| 7,462,121 B2 | 12/2008 | Janson et al. | |
| 7,537,534 B2 | 5/2009 | Janson et al. | |
| 7,601,086 B2 | 10/2009 | Rosemeier et al. | |
| 7,780,562 B2 | 8/2010 | King et al. | |
| 2006/0131832 A1 | 6/2006 | Lindsay et al. | |
| 2008/0178569 A1 | 7/2008 | Hamel et al. | |
| 2009/0000836 A1 | 1/2009 | Kydd | |
| 2009/0107754 A1 | 4/2009 | Doperalski et al. | |
| 2010/0065344 A1 | 3/2010 | Collings, III | |
| 2010/0212993 A1 | 8/2010 | Gagnon | |

OTHER PUBLICATIONS

Kepler Motors—Performance, http://www.keplermotors.com/performance.php, 1 page. Nov. 17, 2010.
Kepler Motors—Technology, http://www.keplermotors.com/technology.php, 2 pages. Nov. 17, 2010.
Kepler Motors—Company, http://www.keplermotors.com/company.php, 2 pages. Nov. 17, 2010.
Kepler Motors—Releases, http://www.keplermotors.com/releases.php, 1 page. Nov. 17, 2010.

* cited by examiner

*Primary Examiner* — J. Allen Shriver, II
*Assistant Examiner* — Bridget Avery
(74) *Attorney, Agent, or Firm* — Bryan Cave LLP

(57) ABSTRACT

Electric vehicle powertrains, highway vehicles, and methods of manufacturing vehicles have dual belts driving wheels from two electric motors. Embodiments have a centrally-located transmission housing containing two belts and pulleys, and motors are mounted outside of the housing. A battery may power the motors and an internal combustion engine may power wheels on the other end of the vehicle through a separate transmission. Each belt may have a tensioner and drive shafts may have universal joints and decouplers. The transmission may have a central wall or supports which may support the pulleys and adjacent pulleys may have a common centerline and be supported by a common pin through the central wall.

20 Claims, 9 Drawing Sheets

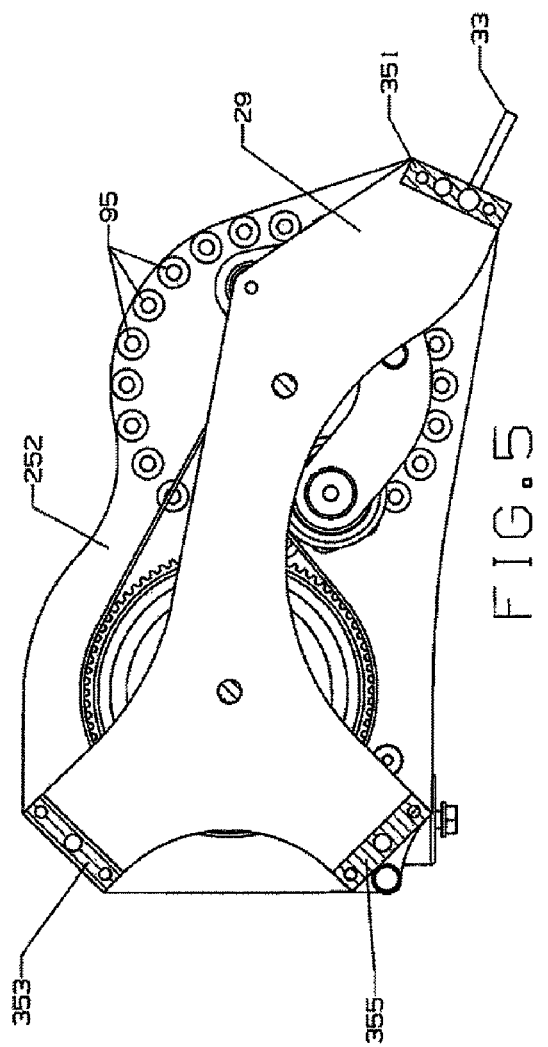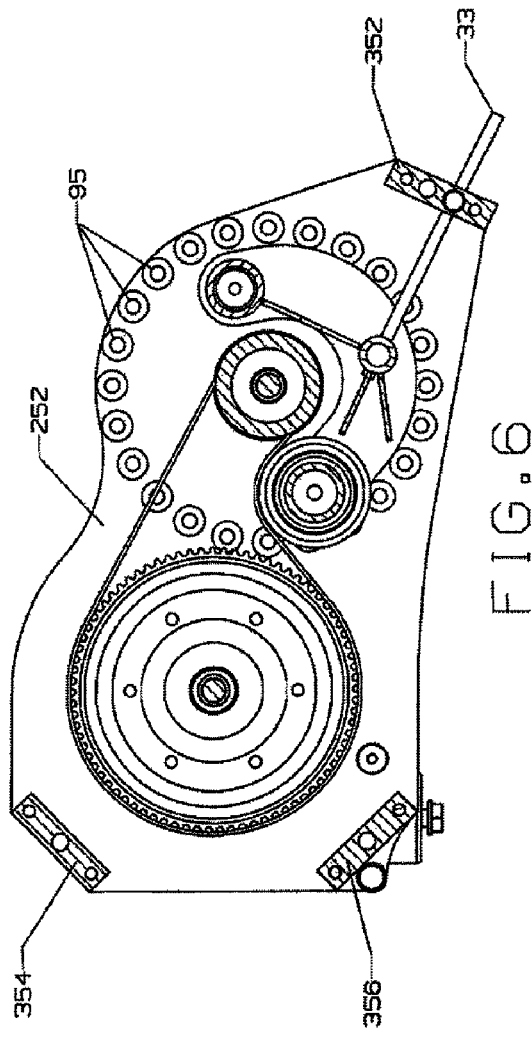

POWERTRAIN, VEHICLE, AND METHOD WITH ELECTRIC MOTORS AND DUAL BELT DRIVE

FIELD OF THE INVENTION

This Invention relates to vehicles that have wheels powered by electric motors and powertrains for such vehicles, and belt drives for vehicles.

BACKGROUND OF THE INVENTION

Various powered vehicles have been used to transport passengers and cargo. Internal combustion engines have been used to power motor vehicles. In addition, electric motors have been used to drive wheels of vehicles, for example, powered by batteries, a generator located on the vehicle, or an external source of electricity. Examples include trains, golf carts, electric highway vehicles, and hybrid electric vehicles. Moreover, belts have been used to transfer power to auxiliary systems on motor vehicles and cogged belts have been used to turn cam shafts. Cogged belts have also been used to drive the rear wheel of motorcycles, and belts have been driven by electric motors and used to drive the wheels of wheelchairs. In addition, a number of types of transmission systems have been used to transmit torque and power from an electric motor to a wheel of a vehicle. As examples, electric motors have been rotatably attached directly to a wheel, have been rotatably attached using an axle with universal joints, have been connected to two wheels through a differential, and have been connected in driving relation through a gear box that provides speed reduction, and have been rotatably connected with a drive belt.

Needs and potential for benefit exist, however, for new and improved ways to transmit the torque and power of electric motors to the wheels of the vehicles. For example, needs or potential for benefit exist for electric motor powertrains for vehicles that are light weight, quiet, durable, inexpensive, easy to maintain, easy to design, that do not require a sealed gearbox containing gear oil, that provide speed reduction, that provide for independent control of torque transmission to two wheels on opposite sides of the vehicle, or a combination thereof, as examples. Further, needs or potential for benefit exist for vehicles having such drivetrains and for methods of manufacturing such powertrains and vehicles. Even further, needs or potential for benefit exist for such powertrains in highway vehicles including hybrid electric vehicles, fully electric vehicles, and all-wheel drive vehicles.

Other needs or potential for benefit or improvement may also be described herein or known in the automotive industry. Room for improvement exists over the prior art in these and other areas that may be apparent to a person of ordinary skill in the art having studied this document.

BRIEF DESCRIPTION OF THE DRAWINGS

FIG. 5 is a right side cross sectional view of the dual belt drive transmission of FIGS. 3 and 4 taken just right of the central wall;

FIG. 6 is a right side cross sectional view of the dual belt drive transmission of FIGS. 3 and 4 taken just left of the central wall;

Figure 1:
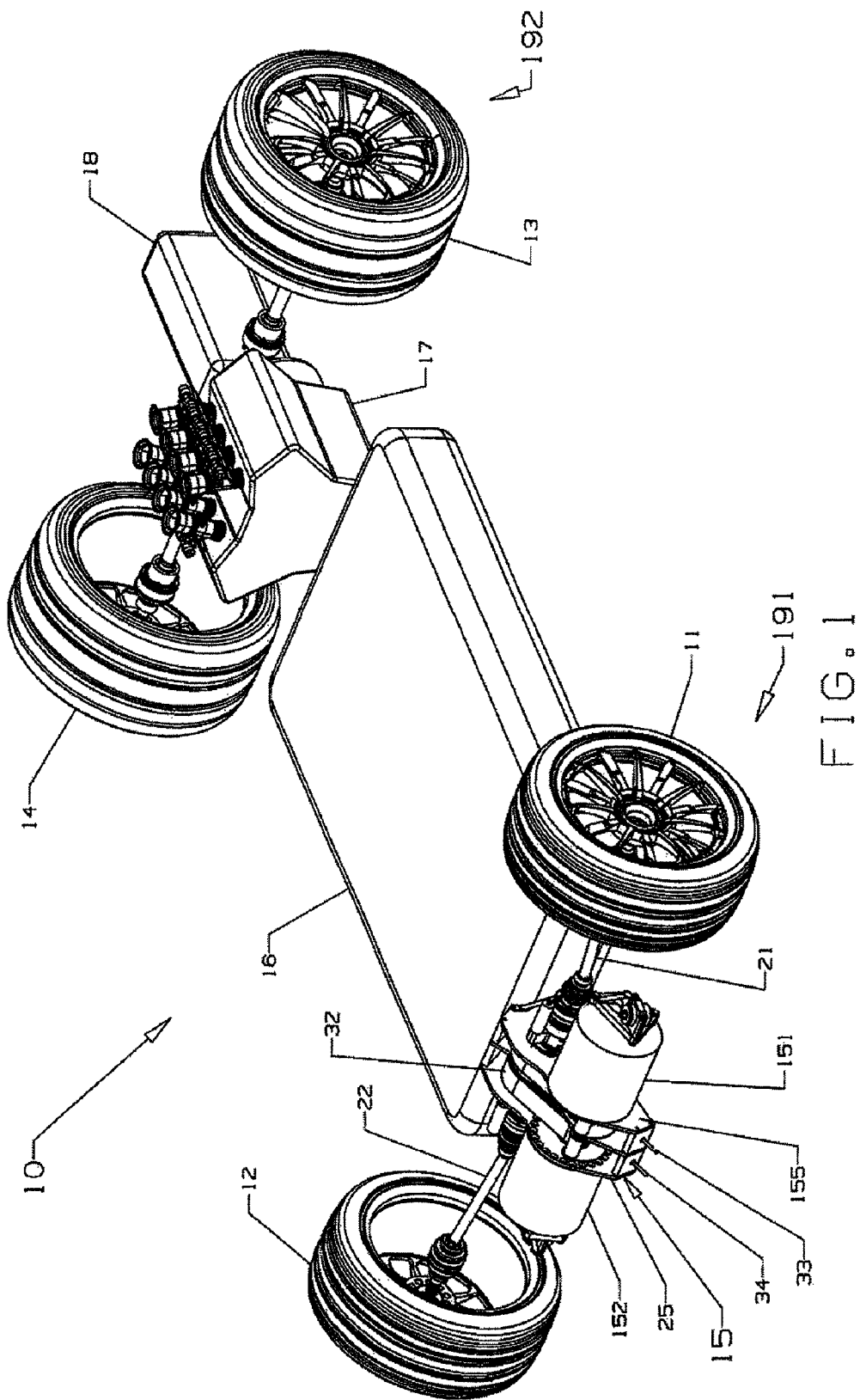
FIG. 1 is an isometric view of a highway vehicle having a dual belt drive transmission driving two wheels, with various components omitted for clarity.

These drawings illustrate, among other things, examples of embodiments of the invention. Other embodiments may differ.

SUMMARY OF PARTICULAR EMBODIMENTS OF THE INVENTION

This invention provides, among other things, various electric vehicle powertrains, highway vehicles, and methods of manufacturing vehicles, as examples. A number of embodiments include two belts, pulleys for each belt, an electric motor driving each drive pulley, a housing containing the belts and pulleys, and drive shafts (e.g., for driving the wheels of the vehicle), for instance. In various embodiments, the belts provide speed reduction, each motor drives one wheel independently from the other wheels, or both, for example. Particular aspects and configurations are novel and beneficial over prior technology.

Various embodiments provide, for example, as an object or benefit, that they partially or fully address or satisfy one or more needs, potential areas for benefit, or opportunities for improvement described herein, or known in the art, as examples. Certain embodiments provide, for example, improved equipment, apparatuses, and methods that transmit the torque and power of electric motors to the wheels of the vehicles. For example, particular embodiments are, include, or concern electric motor powertrains for vehicles. Various embodiments provide, for example, as an object or benefit, that the powertrain is light weight, quiet, durable, inexpensive, easy to maintain, easy to design, predictable in performance, or a combination thereof, as examples. Certain embodiments do not require a sealed gearbox containing gear oil, provide speed reduction, provide for independent control of torque transmission to two wheels on opposite sides of the vehicle, or a combination thereof, for instance. Further, objects or benefits of particular embodiments include providing vehicles having such drivetrains or methods of manufacturing such powertrains and vehicles. In some embodiments, such powertrains may be used in highway vehicles which may be hybrid electric vehicles, fully electric vehicles, or all-wheel drive vehicles, as examples.

Specific embodiments of the invention include various electric vehicle powertrains, for example. Such a powertrain may include a housing, for example, having a left wall and a right wall. The left wall may have an inboard side facing the right wall and an outboard side facing away from the right wall, and the right wall may have an inboard side facing the left wall and an outboard side facing away from the left wall, for example. In a number of embodiments, the left wall and the right wall each have a motor shaft relief and a drive shaft relief, for instance. Various embodiments further include a left electric motor mounted on the outboard side of the left wall at the motor shaft relief in the left wall and having a rotatable motor shaft, and a right electric motor mounted on the outboard side of the right wall at the motor shaft relief in the right wall, also having a rotatable motor shaft.

A number of such embodiments further include a left drive pulley located on the inboard side of the left wall and rotatably attached to the rotatable motor shaft of the left motor through the motor shaft relief in the left wall, and a right drive pulley located on the inboard side of the right wall and rotatably attached to the rotatable motor shaft of the right motor through the motor shaft relief in the right wall, for example. Moreover, a number of embodiments include a left driven pulley located on the inboard side of the left wall at the drive shaft relief in the left wall, and a right driven pulley located on the inboard side of the right wall at the drive shaft relief in the right wall, for instance.

Various such embodiments may also include a left drive shaft rotatably attached to the left driven pulley through the drive shaft relief in the left wall and extending away from the left wall on the outboard side of the left wall, and a right drive shaft rotatably attached to the right driven pulley through the drive shaft relief in the right wall and extending away from the right wall on the outboard side of the right wall, as examples. Further, such embodiments may have a left drive belt on the inboard side of the left wall and extending around the left drive pulley and extending around the left driven pulley so as to rotatably connect the left drive pulley to the left driven pulley, for example. Such embodiments may similarly have a right drive belt on the inboard side of the right wall and extending around the right drive pulley and extending around the right driven pulley so as to rotatably connect the right drive pulley to the right driven pulley, for instance.

In some embodiments, the housing further includes, for example, a central wall between the left wall and the right wall. In such embodiments, the central wall may be between the left drive pulley and the right drive pulley, between the left driven pulley and the right driven pulley, between the left drive belt and the right drive belt, or a combination thereof, for example. Further, in some embodiments, the left drive pulley is supported from both the left wall and the central wall and the right drive pulley is supported from both the right wall and the central wall. Moreover, in some embodiments, the left driven pulley is supported from both the left wall and the central wall and the right driven pulley is supported from both the right wall and the central wall. Even further, in some embodiments, the central wall is a flat plate. Further still, in a number of embodiments, the left wall, the right wall, and the central wall are all parallel to each other, for instance, within five degrees.

Some embodiments further include a left side adjustable tensioner on the inboard side of the left wall, for example, that adjustably presses a tensioner pulley against the left drive belt between the left drive pulley and the left driven pulley. Such embodiments may also include a right side adjustable tensioner on the inboard side of the right wall that adjustably presses a tensioner pulley against the right drive belt between the right drive pulley and the right driven pulley, for instance. Furthermore, some embodiments include multiple joining walls, for example, extending from the left side wall to the right side wall and holding the left side wall in rigid relation to the right side wall. Even further still, in some embodiments, the left drive pulley and the right drive pulley have a common centerline, the left driven pulley and the right driven pulley have a common centerline, or both.

Other specific embodiments include various highway vehicles. Such vehicles may include, for example, a single, centrally-located transmission housing containing a left drive pulley, a right drive pulley, a left driven pulley, and a right driven pulley. In a number of embodiments, such a transmission further includes a left drive belt extending around the left drive pulley and extending around the left driven pulley so as to rotatably connect the left drive pulley to the left driven pulley, and a right drive belt extending around the right drive pulley and extending around the right driven pulley so as to rotatably connect the right drive pulley to the right driven pulley. Further, such a vehicle may also include a left electric motor rotatably attached to the left drive pulley, a right electric motor rotatably attached to the right drive pulley, and a left drive shaft rotatably attached to the left driven pulley and extending outside of the transmission housing. In a number of embodiments, the left drive shaft includes, for instance, at least one universal joint outside of the transmission housing. Such a vehicle may also include a right drive shaft rotatably attached to the right driven pulley and extending outside of the transmission housing. In a number of embodiments, the right drive shaft also includes, for instance, at least one universal joint outside of the transmission housing. Moreover, such a vehicle may include a left wheel rotatably attached to the left drive shaft, and a right wheel rotatably attached to the right drive shaft.

In some such embodiments, the transmission housing has an outside surface, the left electric motor is mounted on the outside surface of the transmission housing, and the right electric motor is mounted on the outside surface of the transmission housing. Further, in a number of embodiments, the left drive shaft includes a left decoupler and the right drive shaft includes a right decoupler. Moreover, in particular embodiments, the left wheel and the right wheel are a first wheel and a second wheel at a first end of the vehicle. In a number of embodiments, the vehicle further includes, for instance, a third wheel and a fourth wheel at a second end of the vehicle and an internal combustion engine driving the third wheel and the fourth wheel. Even further, some embodiments include, for example, a battery powering the left electric motor and the right electric motor.

In certain embodiments, the transmission housing further includes, for instance, a central wall. In a number of embodiments, the central wall is between the left drive pulley and the right drive pulley, the central wall is between the left driven pulley and the right driven pulley, the central wall is between the left drive belt and the right drive belt, or a combination thereof. Further, in various embodiments, the left drive pulley is supported from the central wall, the right drive pulley is supported from the central wall, the left driven pulley is supported from the central wall, the right driven pulley is supported from the central wall, or a combination thereof, as examples. Further, in particular embodiments, such vehicles may include, for example, a left side adjustable tensioner that adjustably presses a tensioner pulley against the left drive belt between the left drive pulley and the left driven pulley, and a right side adjustable tensioner that adjustably presses a tensioner pulley against the right drive belt between the right drive pulley and the right driven pulley. Even further, in certain embodiments, the left drive pulley and the right drive pulley have a common centerline, the left driven pulley and the right driven pulley have a common centerline, or both.

Still further, in some embodiments, the transmission housing further includes, for instance, a central drive pulley support located between the left drive pulley and the right drive pulley. Moreover, in a number of embodiments, the central drive pulley support includes, for instance, a central drive pulley pin that extends to the left drive pulley and to the right drive pulley to support the left drive pulley and the right drive pulley. Similarly, in some embodiments, the transmission housing further includes a central driven pulley support located between the left driven pulley and the right driven pulley. Further, in a number of embodiments, the central driven pulley support includes, for instance, a central driven pulley pin that extends to the left driven pulley and to the right driven pulley to support the left driven pulley and the right driven pulley.

In still other specific embodiments, the invention includes a number of methods, for example, of manufacturing a vehicle. Such methods may include, for instance, in the order indicated here, or in another order, at least certain acts. Such acts may include, for example, manufacturing, obtaining, or providing an electric powertrain. Such a powertrain may include, for example, a housing including, for instance, a left wall and a right wall, the left wall having an inboard side facing the right wall and an outboard side facing away from the right wall, and the right wall having an inboard side facing the left wall and an outboard side facing away from the left wall. In a number of embodiments, the left wall and the right wall each have a motor shaft hole and a drive shaft hole, for example. Further, various embodiments include a left electric motor, for example, mounted on the outboard side of the left wall at the motor shaft hole in the left wall and having a rotatable motor shaft. Similarly a number of embodiments include a right electric motor, for instance, mounted on the outboard side of the right wall at the motor shaft hole in the right wall and having a rotatable motor shaft.

Moreover, such a powertrain may include a left drive pulley located on the inboard side of the left wall and rotatably attached to the rotatable motor shaft of the left motor through the motor shaft hole in the left wall, and a right drive pulley located on the inboard side of the right wall and rotatably attached to the rotatable motor shaft of the right motor through the motor shaft hole in the right wall. Still further, various embodiments may include a left driven pulley located on the inboard side of the left wall at the drive shaft hole in the left wall, and a right driven pulley located on the inboard side of the right wall at the drive shaft hole in the right wall. In a number of embodiments, the left driven pulley and the right driven pulley may have a common centerline, for example. Even further still, such a powertrain may include a left drive shaft, for example, rotatably attached to the left driven pulley through the drive shaft hole in the left wall and extending away from the left wall on the outboard side of the left wall, and a right drive shaft, for instance, rotatably attached to the right driven pulley through the drive shaft hole in the right wall and extending away from the right wall on the outboard side of the right wall.

Furthermore, such a powertrain manufactured, obtained, or provided in such a method may further include a left drive belt on the inboard side of the left wall and extending around the left drive pulley and extending around the left driven pulley so as to rotatably connect the left drive pulley to the left driven pulley. Similarly, such a powertrain may include a right drive belt on the inboard side of the right wall and extending around the right drive pulley and extending around the right driven pulley so as to rotatably connect the right drive pulley to the right driven pulley. Additionally, in such embodiments, the powertrain may include a central wall between the left wall and the right wall. In a number of embodiments, for example, the central wall is between the left drive pulley and the right drive pulley, the central wall is between the left driven pulley and the right driven pulley, and the central wall is between the left drive belt and the right drive belt. Moreover, in a number of such embodiments, the left driven pulley is supported from both the left wall and the central wall, and the right driven pulley is supported from both the right wall and the central wall.

Still further, in a number of such methods, the electric powertrain may include a left side adjustable tensioner, for example, on the inboard side of the left wall, that adjustably presses a tensioner pulley against the left drive belt between the left drive pulley and the left driven pulley, and a right side adjustable tensioner, for instance, on the inboard side of the right wall, that adjustably presses a tensioner pulley against the right drive belt between the right drive pulley and the right driven pulley. Such a powertrain may further include multiple joining walls extending from the left side wall to the right side wall, for example, and holding the left side wall in rigid relation to the right side wall.

Even further, such a method may include, for example, acts of manufacturing, obtaining, or providing two universal joints in the left drive shaft, and two universal joints in the right drive shaft, manufacturing, obtaining, or providing a left first wheel rotatably attached to the left drive shaft at a first end of the vehicle, a right second wheel rotatably attached to the right drive shaft at the first end of the vehicle, a left third wheel at a second end of the vehicle, and a right fourth wheel at the second end of the vehicle. Even further still, such a method may include manufacturing, obtaining, or providing a battery powering the left electric motor and the right electric motor.

In addition, various other embodiments of the invention are also described herein, and other benefits of certain embodiments may be apparent to a person of ordinary skill in the art.

DETAILED DESCRIPTION OF EXAMPLES OF EMBODIMENTS

The subject matter described herein includes, as examples, various vehicles including highway vehicles, powertrains such as electric vehicle powertrains, and methods, for example, of manufacturing such vehicles and powertrains. As used herein, an electric vehicle is a vehicle that uses electricity to drive the vehicle, for example, using one or more electric motors to turn one or more wheels of the vehicle. The electric motors may be powered from a generator or battery on the vehicle, or from an external source, as examples. In different embodiments, an electric vehicle may be powered using a fuel cell, a solar collector, a generator turned by an engine, such as an internal combustion engine, or a combination thereof, as examples. Further, as used herein, hybrid electric vehicles are a type of electric vehicle. Furthermore, as used herein, a highway vehicle is a type of vehicle that is suitable for licensing and operation on public highways and city streets.

The drawings include reference numbers used in this section that refer to parts or all of the subject matter illustrated. There may be exceptions, but generally, each reference number is found in the figure that has the same number as the first digit of the reference number (the first two digits in the case of FIG. 10). For many of the reference numbers, however, that same reference number, and the component or aspect to which that number refers, may be found in other figures as well. Referring to the drawings, FIG. 1 illustrates an example of a highway vehicle, vehicle 10, that includes wheels 11, 12, 13, and 14, electric vehicle powertrain 15, battery 16, internal combustion engine 17, and transmission 18. Other components of vehicle 10 have been omitted for clarity including the frame, body, suspension (e.g., double wishbone, coil springs, and shocks), wiring, controls, steering system, exhaust system, fuel system, pollution control systems, control systems, interior, doors, glass, and safety equipment. Examples of such components and systems, and other omitted components and systems, however, are known in the art.

In the embodiment illustrated, engine 17 is a V8 spark-ignition fuel injected engine with eight individual velocity stacks. Other embodiments, however, may have one or more carburetors or direct injection, as other examples. Further, various embodiments may have 3, 4 (e.g., in line or horizontally opposed), 5, 6 (e.g., in line, vee, or horizontally opposed), 10, or 12 cylinders, may have two or four overhead cams, may have variable valve timing for the intake valves, exhaust valves, or both, may be naturally aspirated or turbocharged (e.g., and intercooled) or a combination thereof, as examples. In various embodiments, engine 17 may be a spark-ignition engine or a compression ignition (i.e., Diesel) engine, and may have port-type fuel injection or direct injection, for instance In different embodiments, vehicle 10 may be a mass produced vehicle, a limited production vehicle (e.g., a supercar), a highway vehicle (e.g., license to use on public highways and streets) a race car, an off-road vehicle, a truck, or a military vehicle, as examples.

Transmission 18 may deliver power from engine 17 to wheels 13 and 14 at end 192 of vehicle 10. Transmission 18 may be an automatic or manual transmission, as examples. In some embodiments, transmission 18 may be a dual clutch transmission (DCT) or a continuously variable transmission (CVT) as examples. Transmission 18 may include a differential, which may be open or limited slip (e.g., clutch, geared, viscous, gerotor, electronic, or locking). Drive shafts may connect transmission 18 to wheels 13 and 14. In different embodiments, these driveshafts may each have one or two universal joints (e.g., constant-velocity joints), for example. In some embodiments, vehicle 10 may use engine 17 for locomotion whenever vehicle 10 is in motion, but drivetrain 15 may be used, with power from battery 16, to launch the vehicle, to pass, for hard cornering, in situations where traction is limited, or a combination thereof, as examples. In some embodiments, drivetrain 15 may be used for regenerative braking, and motors 151 and 152 may generate electricity that may be stored in battery 16. Further, in some embodiments, vehicle 10 may be plugged in to a charger or wall outlet when vehicle 10 is parked to charge battery 16. Further, in some embodiments, a generator may be connected to engine 17 or motors 151 and 152 may be used to generate electricity to charge battery 16 while vehicle 10 is in motion.

In the embodiment illustrated, vehicle 10 (e.g., at end 191) and powertrain 15 also includes a single, centrally-located transmission 155, left electric motor 151, and right electric motor 152. FIGS. 2-9 illustrate various parts of powertrain 15 with certain components omitted from some views for clarity. As used herein, a statement that there is a "single" transmission (e.g., 155) containing certain components does not exclude the possibility that there is another transmission (e.g., 18) on the vehicle (e.g., driving other wheels of the vehicle). Further, as used herein, "centrally located", when referring to a transmission (e.g., 155) means that the transmission is located between the drive wheels (e.g., 11 and 12). Even further, in certain embodiments, a point on a common centerline (e.g., neglecting any toe in or camber) of the two wheels, that is equal distant from the two wheels, falls within the space occupied by the (e.g., housing of the) transmission.

Figure 2:
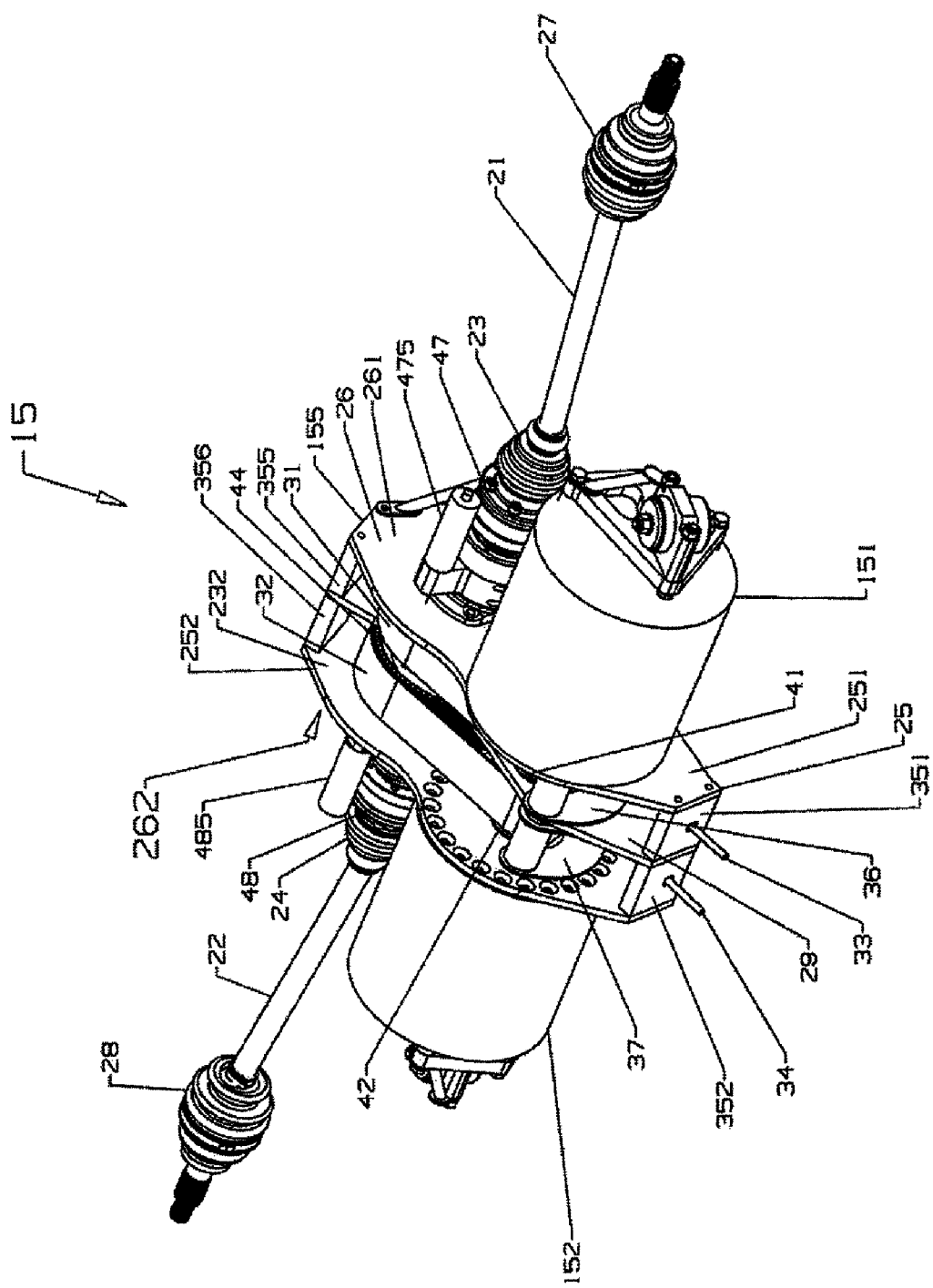
FIG. 2 is an isometric view of an electric vehicle powertrain (e.g., for the vehicle shown in FIG. 1) having two electric motors and a dual belt drive transmission driving two drive shafts.

As shown in FIG. 2, transmission 155 includes centrally-located housing 25 (e.g., transmission housing). In the embodiment illustrated, centrally-located (e.g., transmission) housing 25 contains left drive pulley 41 right drive pulley 42, left driven pulley 43, and right driven pulley 44, shown, for example, in FIGS. 4 and 7. In the embodiment shown, transmission 155 and housing 25 further includes left drive belt 31 (e.g., shown in FIG. 3) extending around left drive pulley 41 and extending around left driven pulley 43 so as to rotatably connect left drive pulley 41 to left driven pulley 43. As used herein, two components that rotate (i.e., about an axis relative to other structure) are considered to be "rotatably connected" if when one component rotates, the other rotates proportionally. Further, in the embodiment shown, transmission 155 and housing 25 further include right drive belt 32 extending around right drive pulley 42 and extending around right driven pulley 44 so as to rotatably connect right drive pulley 42 to right driven pulley 44. Belts 31 and 32 may be flat belts, for instance. In other embodiments, on the other hand, belts 31 and 32 may be vee belts. Further, in certain embodiments, belts 31 and 32 may be multi-vee belts. Even further, in some embodiments, belts 31 and 32 may be cogged belts, for example, of the configuration that has been used as timing belts. Belts 31 and 32 may be of a type used for motorcycle drives, for example. In some embodiments, belts 31 and 32 may be fiber reinforced, for instance, carbon reinforced.

In this embodiment shown, the left and right sides of drivetrain 15 are symmetrical (e.g., have corresponding parts on opposite sides, for example, of center wall 29, that are of the same size, which are in some cases identical and in some cases opposite hand) and yet drive the left and right wheels (e.g., 11 and 12) independently (e.g., at different speeds, different torques, or both). In the embodiment shown, left drive pulley 41 and right drive pulley 42 have a common centerline, and left driven pulley 43 and right driven pulley 44 have a common centerline. In other embodiments, however, left drive pulley 41 and right drive pulley 42 have a common centerline, but left driven pulley 43 and right driven pulley 44 do not have a common centerline. Further, in still other embodiments, however, left drive pulley 41 and right drive pulley 42 do not have a common centerline, but left driven pulley 43 and right driven pulley 44 do have a common centerline. Even further in yet other embodiments, left drive pulley 41 and right drive pulley 42 do not have a common centerline, and left driven pulley 43 and right driven pulley 44 do not have a common centerline. As used herein, two centerlines are considered to be "common" if they are within ¼ inch offset at a closest point and are within 5 degrees angular variation. Other embodiments are within ⅛, %, 1, or 2 inch(es) offset and within 1, 2, 4, 7, 10, or 15 degrees angular variation, as other examples.

Further, in the embodiment illustrated of vehicle 10 and powertrain 15, left electric motor 151 is rotatably attached to left drive pulley 41, and right electric motor 152 is rotatably attached to right drive pulley 42. As used herein, two components are "rotatably attached" if both components rotate and the two components are connected together (e.g., directly or indirectly) such that when one rotates, the other component rotates at the same speed. Even further, in the embodiment shown, left drive shaft 21 is rotatably attached to left driven pulley 43. As shown, left drive shaft 21 extends outside of (e.g., transmission) housing 25. Similarly, in the embodiment shown, right drive shaft 22 is rotatably attached to right driven pulley 44, and right drive shaft 22 extends outside of housing 25. In a number of embodiments, each (e.g., left and right) drive shaft includes, for instance, at least one universal joint outside of the housing (e.g., transmission housing). As shown best in FIG. 2, left drive shaft 21 includes inboard universal joint 23 and outboard universal joint 27, and right drive shaft 22 includes inboard universal joint 24 and outboard universal joint 28. Universal joints 23, 24, 27, and 28 may be constant-velocity (CV) joints, for example. Moreover, as shown in FIG. 1, vehicle 10 includes left wheel 11 rotatably attached to left drive shaft 21, and right wheel 12 rotatably attached to right drive shaft 22.

In this embodiment, powertrain 15, including housing 25 and the contents thereof, is sprung weight (other than part of driveshafts 21 and 22 outboard of universal joints 23 and 24). As a result, unsprung weight or mass of vehicle 10 is minimized, for example, in comparison with alternatives wherein motors, pulleys, part of belts, etc., move (e.g., up and down) with the wheels (e.g., 11 and 12). This may provide better wheel contact with the road, for instance, on uneven surfaces, and may provide better vehicle handling at speed. This may be a significant improvement, for example, over motorcycle powertrains or drivetrains that use belts. Further, in the embodiment depicted, drive pulleys 41 and 42 are the same size (e.g., diameter) and driven pulleys 43 and 44 are the same size, but drive pulleys 41 and 42 are smaller than driven pulleys 43 and 44. This provides a speed reduction and increase in torque (e.g., from motor to wheel). The speed ratio may be, for example, 3:1, 3.5:1, or 4:1, as examples. Other embodiments may have a different speed or diameter ratio.

Figure 4:
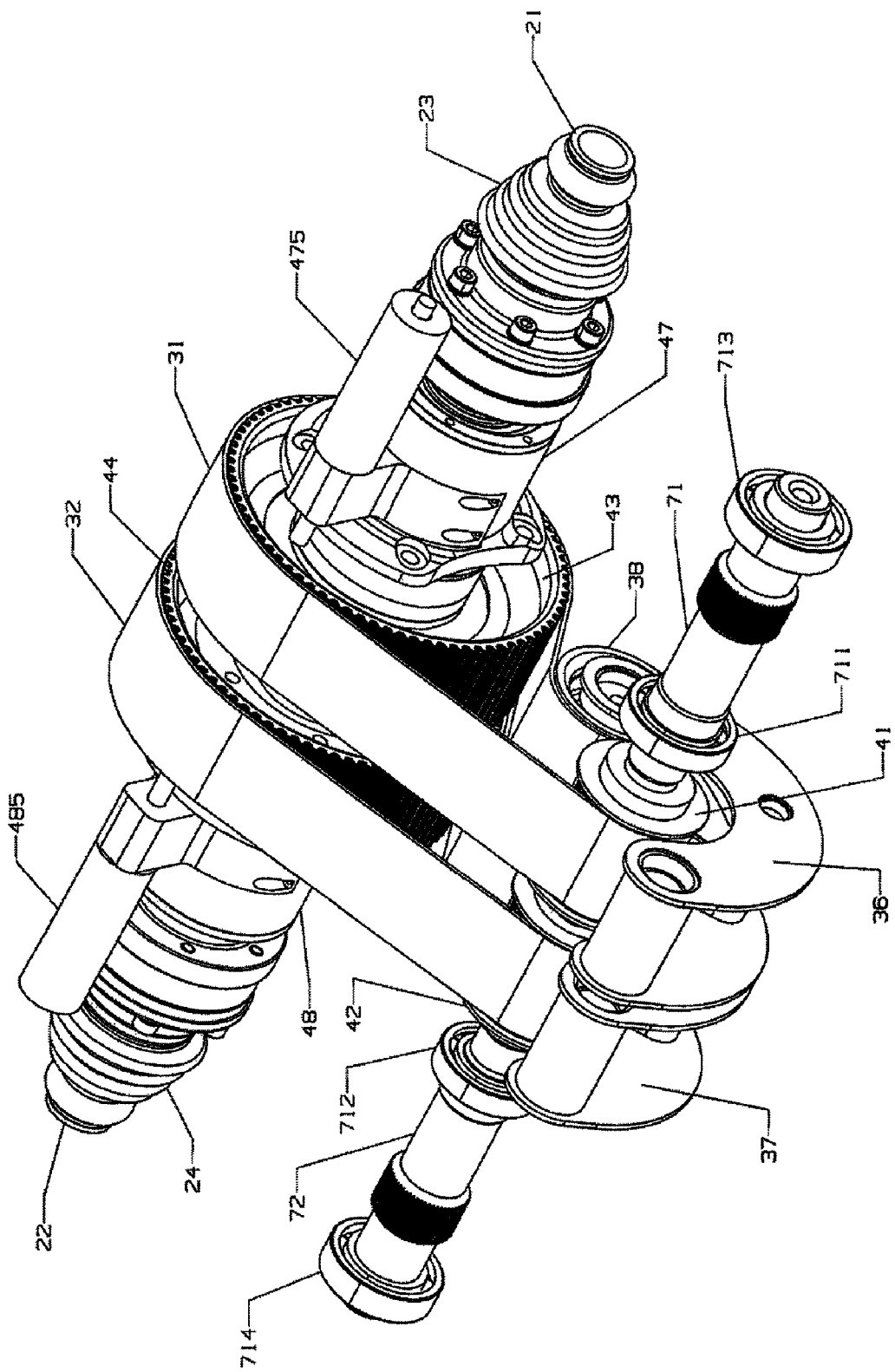
FIG. 4 is an isometric view of the dual belt drive transmission of the electric vehicle powertrain of FIG. 2 (e.g., for the vehicle shown in FIG. 1) having various components omitted for clarity including the transmission housing.

In the embodiment shown, housing 25 (e.g., transmission housing) has outside surface 26 and left electric motor 151 is mounted on outside surface 26 of housing 25. Further, in this embodiment, right electric motor 152 is mounted on outside surface 26 of (e.g., transmission) housing 25. Further, as shown in FIGS. 2 and 4, left drive shaft 21 includes left decoupler 47 and right drive shaft 22 includes right decoupler 48. Decouplers 47 and 48 are operated by solenoids or servos 475 and 485 in the embodiment illustrated. In this embodiment, decouplers 47 and 48 disconnect (i.e., rotatably decouple) wheels 11 and 12 from driven pulleys 43 and 44 when decouplers 47 and 48 are decoupled. This may be done, for example, to reduce friction and losses when vehicle 10 is moving but electric vehicle powertrain 15 is not in use (e.g., when engine 17 is driving vehicle 10 through transmission 18 and further power from powertrain 15 is not needed). Further, decouplers 47 and 48 rotatably connect, and rotatably attach wheels 11 and 12 to driven pulleys 43 and 44 when decouplers 47 and 48 are coupled. Even further, as used herein, wheels 11 and 12 are considered to be "rotatably attached" to driven pulleys 43 and 44 in embodiments, such as the embodiment illustrated, that are provided with decouplers 47 and 48 that can be decoupled at certain times. Further, in some embodiments, when vehicle 10 is in motion, when decouplers 47 and 48 are about to be coupled, motors 151 and 152 may first be driven (e.g., by the controller or variable-speed drive, using power from battery 16, for example) to synchronize the speed so that the speed difference across decouplers 47 and 48 is near zero. Once this is done, decouplers 47 and 48 may be coupled.

In a number of embodiments, motors 151 and 152 and powertrain 15 provide independent control (e.g., delivery of torque) to wheels 11 and 12 of vehicle 10 for torque vectoring or torque biasing, for example. This feature can be used, for example, to control wheel spin (e.g., for traction control), to help steer the vehicle, to provide stability control, to control the amount of oversteer or understeer that is induced when cornering, or a combination thereof, as examples. Motors 151 and 152 may be alternating current (AC) (e.g., brushless) or direct current (DC) motors, in different embodiments. Each motor 151 and 152 may have a variable-speed power supply or drive, for example, a variable-frequency AC drive or a variable-voltage DC drive. Motors 151 and 152 may be controlled, or the variable-speed drives may be controlled, for example, by a digital controller, for instance.

Referring to FIG. 1, in the embodiment illustrated, left wheel 11 and right wheel 12 are a first wheel and a second wheel at first end 191 of vehicle 10. In this embodiment, vehicle 10 further includes third wheel 13 and fourth wheel 14 at second end 192 of vehicle 19. Moreover, in this embodiment, internal combustion engine 17 drives third wheel 13 and fourth wheel 14 through transmission 18. In a number of embodiments, first end 191 is the front of vehicle 10 and second end 192 is the rear of vehicle 10. In other embodiments, however, the first end of the vehicle may be the rear and the second end may be the front. In other words, in different embodiments, the engine may drive either the rear wheels or the front wheels, and one or more electric motors (e.g., 151 and 152) may drive the wheels at the opposite end of the vehicle. Still other embodiments may have electric powertrains (e.g., 15) at both ends (e.g., 191 and 192, front and back) of the vehicle, as another example.

Even further, some embodiments include, for example, a battery (e.g., 16 shown in FIG. 1) powering the left electric motor (e.g., 151) and the right electric motor (e.g., 152). Such a vehicle may be a hybrid electric vehicle, for instance (e.g., as shown) or may be a fully electric (e.g., no engine) vehicle. In some embodiments, the electric motor or motors (e.g., 151 and 152) may act as a generator during braking and may charge battery 16 to recover a portion of the braking energy that otherwise would be lost. Other embodiments, however, may lack a battery used to power the drive motors. Rather, in some embodiments, a generator (e.g., driven by the engine, for instance, 17) may power the electric motor or motors (e.g., 151 and 152). In some embodiments, providing power and torque to wheels not mechanically driven by the engine (e.g., by engine 17 through transmission 18) may help to move the vehicle in situations where the traction available to the wheels (e.g., 13 and 14) driven by the engine (e.g., by engine 17 through transmission 18) is not sufficient by itself.

As shown in FIGS. 2, 3, 5, and 7, in the embodiment illustrated, housing 25 further includes central wall 29. As shown, in this particular embodiment, central wall 29 is between left drive pulley 41 and right drive pulley 42, central wall 29 is between left driven pulley 43 and right driven pulley 44, and central wall 29 is between left drive belt 31 and right drive belt 32. Further, in this embodiment, left drive pulley 41 is supported from central wall 29, right drive pulley 42 is supported from central wall 29, left driven pulley 43 is supported from central wall 29, and right driven pulley 44 is supported from central wall 29. How these pulleys are supported from central wall 29, in the embodiment illustrated, is shown in more detail in FIG. 7.

Figure 7:
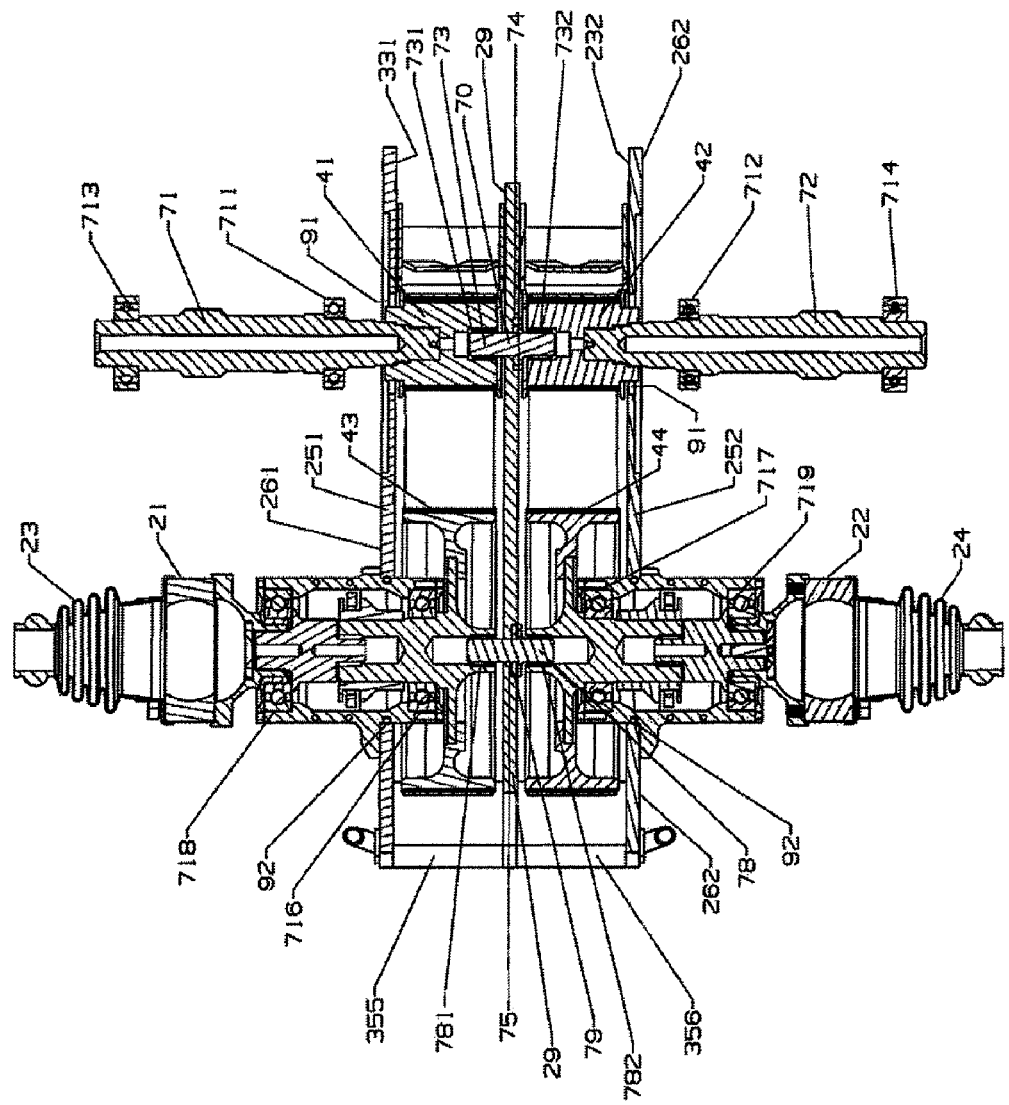
FIG. 7 is a top cross sectional view of the dual belt drive transmission of FIGS. 3 and 4 taken through the center of the drive pulleys and the center of the driven pulleys.
Figure 8:
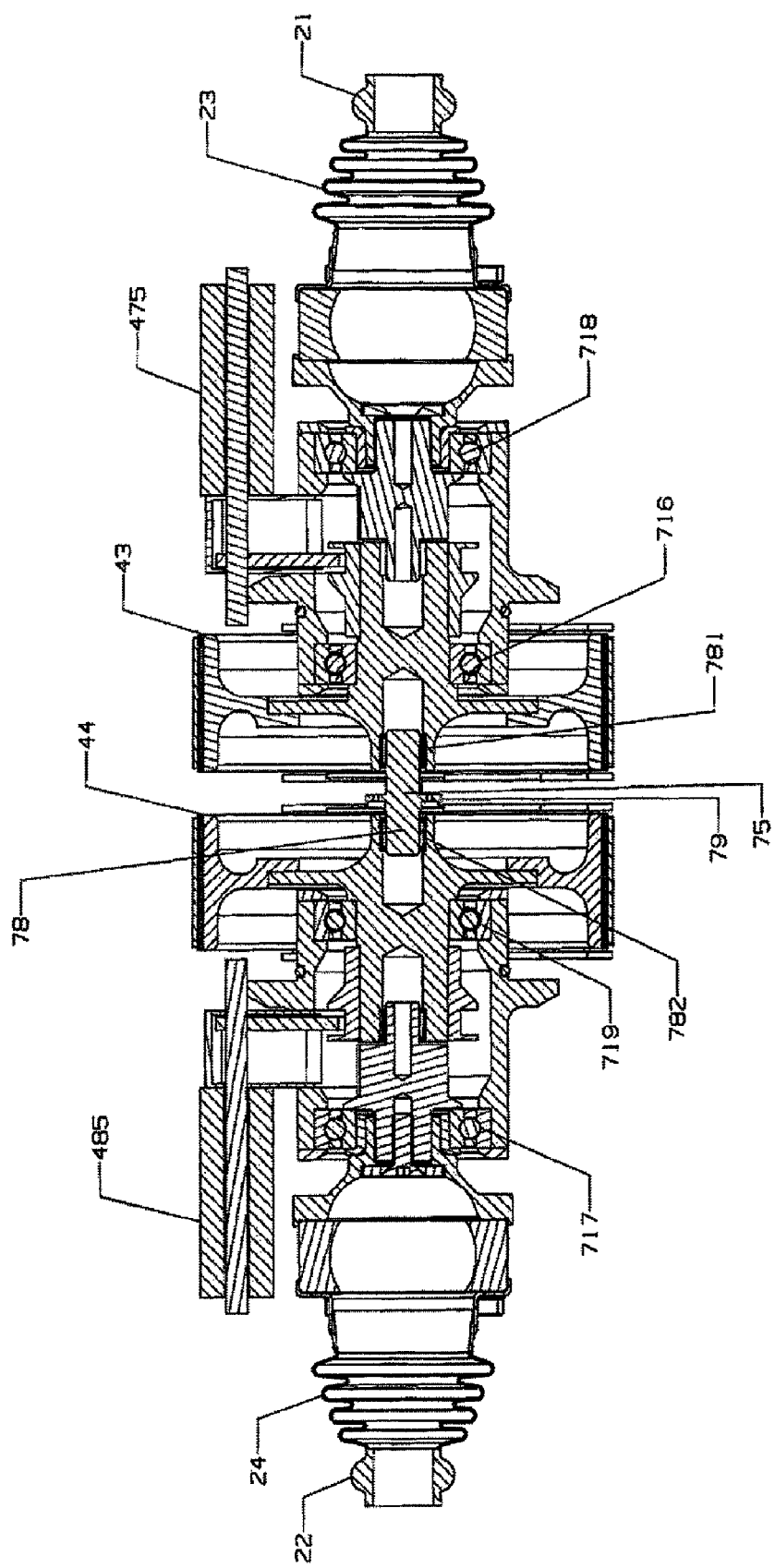
FIG. 8 is a front cross sectional view of the dual belt drive transmission of FIGS. 3 and 4 taken through the centerline of the driven pulleys.

Still further, in housing 25, central wall 29 is an example of, or part of, a central drive pulley support located, for instance, between left drive pulley 41 and right drive pulley 42. The shape of central wall 29 is shown, for example, in FIG. 5. Moreover, as shown in FIG. 7, central drive pulley support 70 includes central drive pulley pin 73 that extends to left drive pulley 41 and to right drive pulley 42 to support left drive pulley 41 and right drive pulley 42. In the embodiment illustrated, central drive pulley pin 73 is attached to central wall 29 with flange 74 and multiple fasteners that extend through holes in flange 74 and central wall 29. Further, in the embodiment illustrated, central drive pulley pin 73 extends through a hole in central wall 29 and extends into left drive pulley 41 and right drive pulley 42. In this particular embodiment, left drive bearing 731 supports left drive pulley 41 from central drive pulley pin 73 and right drive bearing 732 supports right drive pulley 42 from central drive pulley pin 73. In the embodiment shown, central drive pulley pin 73 is solid. In various embodiments, bearings may be needle, roller, or ball bearings, for example. In the embodiment shown, bearings 711-714 are ball bearings and bearings 731 and 732 are needle bearings. Further, housing 25 is not sealed, so individually sealed bearings may be used in the embodiment illustrated. Permanently lubricated bearings may be used in some embodiments.

In other embodiments, however, a central pulley pin may be hollow. In some embodiments, for example, the drive pulleys may each have a shaft that turns with the pulley that extends, for example, to the central wall, central support, or into a hollow central pulley pin. In certain embodiments of this type described, bearings may be provided between the shaft that turns with the pulley and the hollow central pulley pin, for instance. As used herein, a pin extends "to" a pulley if the pin extends inside the pulley, if the pin extends to surround and support part of a shaft that is concentric with and supports the pulley, or if the pin touches the pulley during any part of the range of motion of the pulley, whether the pin touches the pulley directly or through a bearing. Still other embodiments may omit a central pulley pin (e.g., for the drive pulley, driven pulley, or both) but may include a central pulley support (e.g., for the drive pulley, driven pulley, or both) that is formed or machined into the central wall. In particular embodiments, a bearing is pressed into a hole in the central wall, for example, that supports the pulley or pulleys.

In the embodiment illustrated, left drive pulley 41 and right drive pulley 42 are also supported by rotatable motor shafts 71 and 72 (i.e., of motors 151 and 152 shown, for example, in FIGS. 1-2). In the embodiment shown, motor shafts 71 and 72 are rotatably mounted in bearings 711, 713, 712, and 714. In other embodiments, however, drive pulleys, such as 41 and 42, may be supported only by the motor shafts, and the central drive pulley support, central pulley pin, central wall, or a combination thereof, may be omitted. In still other embodiments, drive pulleys, such as 41 and 42, may be supported only by the central drive pulley support, central pulley pin, central wall, or a combination thereof, and not by the motor shafts, as another example.

Similarly, in housing 25, central wall 29 is an example of, or part of, a central driven pulley support located between left driven pulley 43 and right driven pulley 44. As shown in FIG. 7, central driven pulley support 75 includes, for instance, central driven pulley pin 78 (also shown in FIG. 8) that extends to left driven pulley 43 and to right driven pulley 44 to support left driven pulley 43 and right driven pulley 44. As shown in FIG. 7, central driven pulley pin 78 is attached to central wall 29 with flange 79 and multiple fasteners that extend through holes in flange 79 and central wall 29. Further, in the embodiment illustrated, central driven pulley pin 78 extends through a hole in central wall 29 and extends into left driven pulley 43 and right driven pulley 44. In this particular embodiment, left driven bearing 781 supports left driven pulley 43 from central driven pulley pin 78 and right driven bearing 782 supports right driven pulley 44 from central driven pulley pin 78. In the embodiment shown, central driven pulley pin 78 is solid.

In other embodiments, however, the central driven pulley support, central driven pulley pin, or both, may be as described herein for various embodiments of the central driven pulley support, central drive pulley pin, or both. For example, in some embodiments, the central driven pulley pin may be hollow. Further, in other embodiments, the central driven pulley pin or central driven pulley support may be omitted or may provide complete support for the driven pulleys. Moreover, in the embodiment shown, drive shafts 21 and 22 inboard of universal joints 23 and 24 are rotatably mounted in bearings 716, 718, 717, and 719. In other embodiments, however, driven pulleys, such as 43 and 44, may be supported only by the drive shafts, and the central driven pulley support, central driven pulley pin, central wall, or a combination thereof, may be omitted. In still other embodiments, driven pulleys, such as 43 and 44, and drive shafts, such as 21 and 22 inboard of universal joints 23 and 24, for example, may be supported by a central driven pulley support, by a central driven pulley pin, by a central wall (e.g., 29), or by a combination thereof, and by one other bearing per shaft (e.g., 716 or 718 and 717 or 719), as another example.

Further, in the embodiment shown, vehicle 10, powertrain 15, and centrally-located transmission 155 include, for example, a left side adjustable tensioner 36 that adjustably presses tensioner pulley 38 against left drive belt 31 between left drive pulley 41 and left driven pulley 43, and right side adjustable tensioner 37 that adjustably presses tensioner pulley 39 against right drive belt 32 between right drive pulley 42 and right driven pulley 44. See FIG. 3, for example. As used herein, "adjustable", when referring to a tensioner, means that a person can adjust the tension (e.g., using hand tools) in a reversible manner without replacing or plastically deforming any components of the powertrain weighing over one pound. In the embodiment shown, tensioners 36 and 37 include threaded rods 33 and 34 (respectively) that can be rotated (e.g., manually) to independently adjust belt tension.

Figure 9:
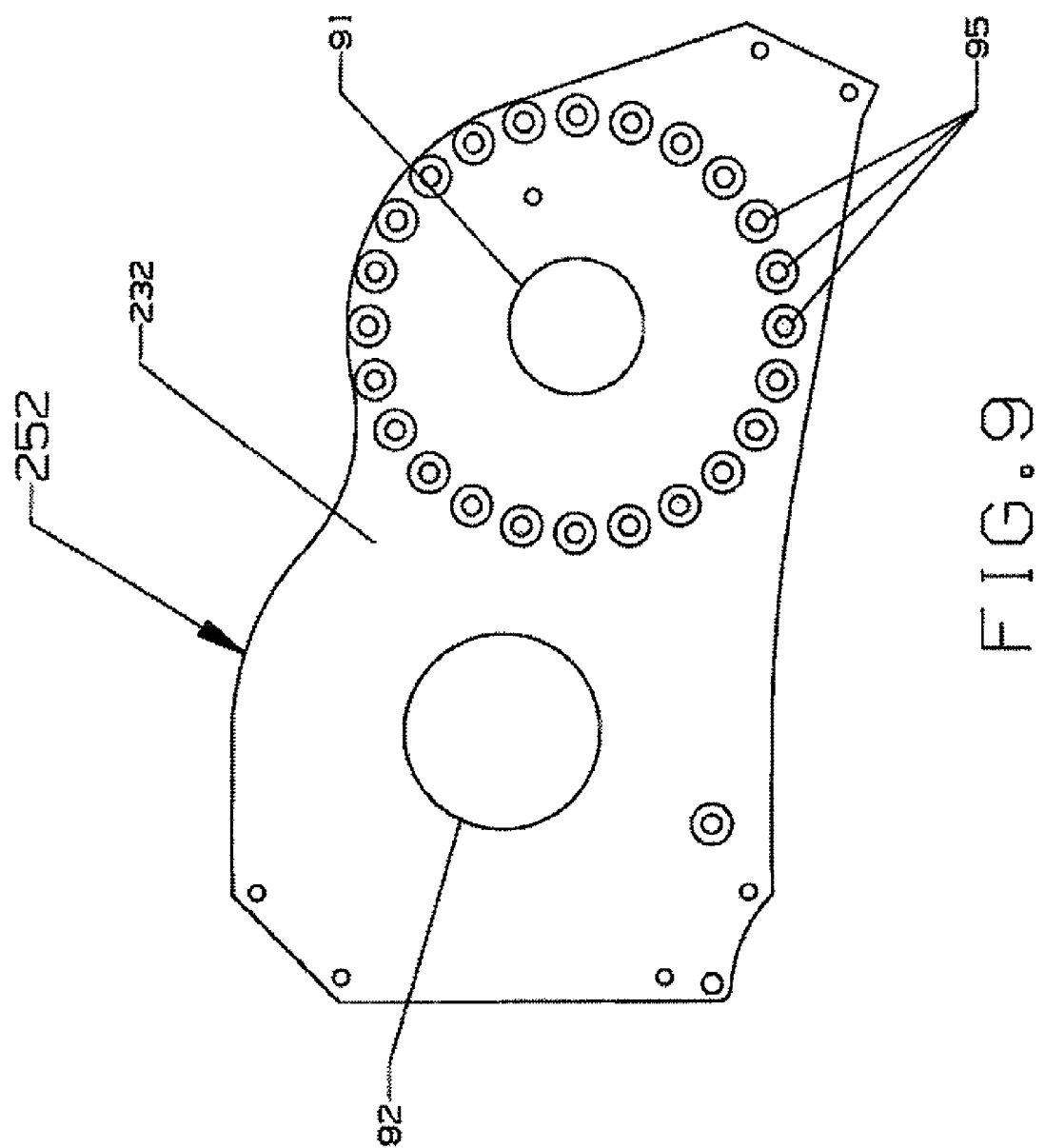
FIG. 9 is a right side view of the right side wall of the dual belt drive transmission of FIGS. 3 and 4.

As shown in FIGS. 2, 3, 5, and 6, electric vehicle powertrain 15 includes housing 25 that includes left wall 251 and right wall 252. Left wall 251, in this embodiment, has inboard side 331 (shown in FIG. 3) facing right wall 252 and outboard side 261 (shown in FIG. 2) facing away from right wall 252. Further, right wall 252, in the embodiment shown, has inboard side 232 (shown in FIG. 2) facing left wall 251 and outboard side 262 facing away from left wall 251. In the embodiment illustrated, outboard side 261 of left wall 251 and outboard side 262 or right wall 252 each form part of outside surface 26 of housing 25. Additionally, FIG. 9 illustrates right wall 252 by itself. In the embodiment illustrated, left wall 251 is a mirror image of right wall 252. In the embodiment shown, left wall 251 and right wall 252 each have a motor shaft relief and a drive shaft relief, for instance. As shown in FIG. 9, in the embodiment illustrated, right wall 252 includes motor shaft relief 91 and drive shaft relief 92. Left Wall 251 may be similar (e.g., opposite hand). In the embodiment shown, motor shaft relief 91 and drive shaft relief 92 are round holes through right wall 252, for example. In other embodiments, the motor shaft relief, the drive shaft relief, or both, may be another shape opening suitable to pass a shaft, such as a hole of another shape (e.g., polygonal, oval, a slot, square, rectangular, triangular, pentagonal, hexagonal, octagonal, or star shaped) or may extend to a side of the wall (e.g., have a C shape or be shaped like a bay in the wall).

Figure 3:
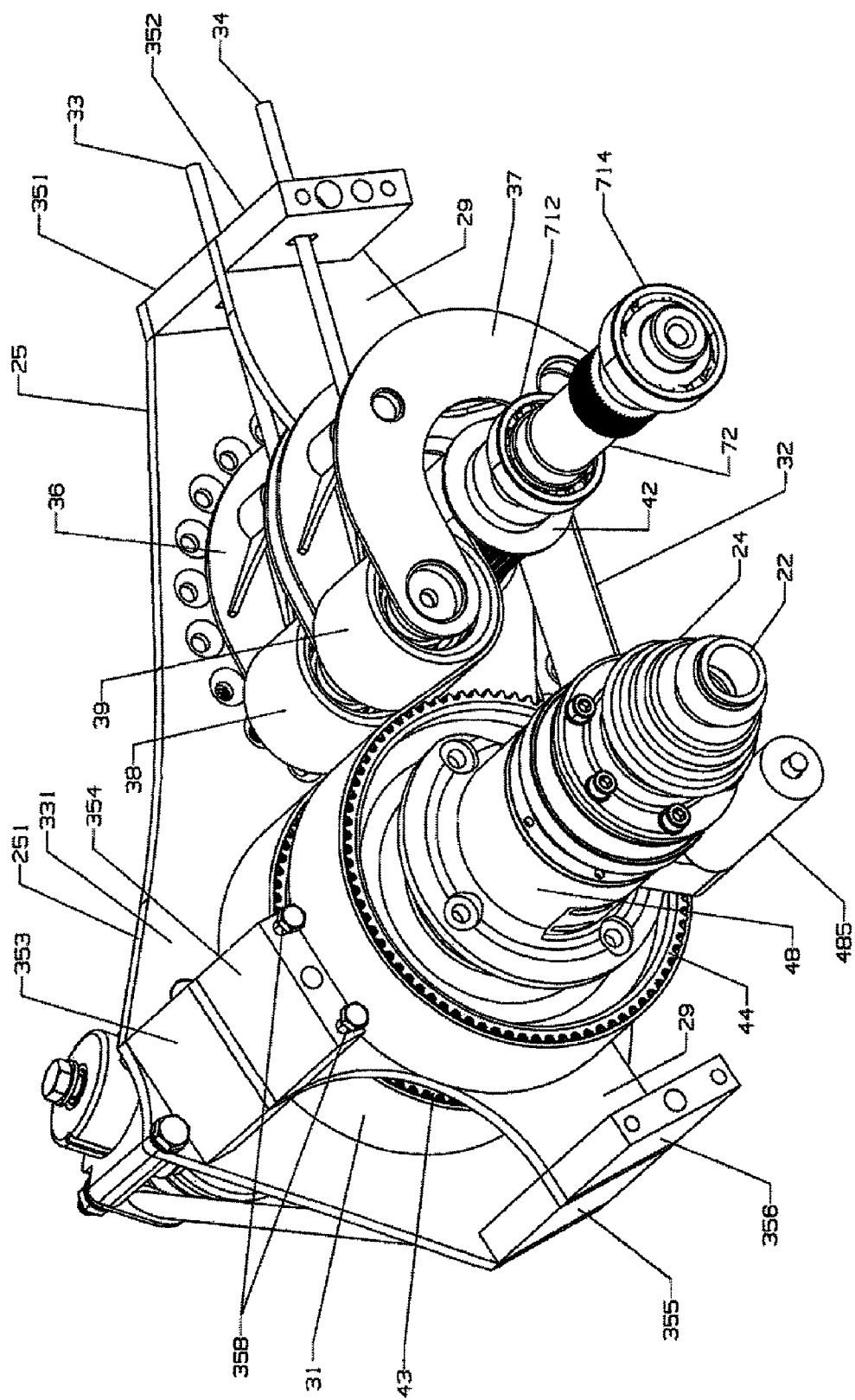
FIG. 3 is an isometric view of the dual belt drive transmission of the electric vehicle powertrain of FIG. 2 (e.g., for the vehicle shown in FIG. 1), which has been turned upside down, having various components omitted for clarity.

As shown in FIG. 2, right electric motor 152 is mounted on outboard side 262 (i.e., opposite inboard side 232 shown in FIGS. 2, 5, 6, and 9) of right wall 252 at motor shaft relief 91 in right wall 252. Motor 152 may be attached to wall 252 with fasteners (e.g., bolts or screws), which may extend into or through holes 95 shown in FIGS. 5, 6, and 9. In the embodiment illustrated, in fact, right electric motor 152 is mounted concentrically (e.g., within +/−0.0625 inches) with motor shaft relief 91 in right wall 252. In other embodiments, however, the electric motor, motors, shaft, or shafts may not be concentric with the relief or reliefs, as other examples. As shown in FIGS. 3 and 7, right electric motor 152 has rotatable motor shaft 72 which extends through motor shaft relief 91 in right wall 252 and rotatably attaches to drive pulley 42. FIG.

7 also shows walls 251 and 252 and reliefs 91 and 92 therein. In the embodiment illustrated, left electric motor 151 is mounted on outboard side 261 of left wall 251 at motor shaft relief 91 (shown in FIG. 7) in left wall 251. Left electric motor 151 may be mounted to left wall 251 similarly to how right electric motor is mounted to right wall 252, for example.

In the embodiment shown, left drive pulley 41 located on inboard side 331 of left wall 251 is rotatably attached to rotatable motor shaft 71 of left motor 151 through motor shaft relief 91 in left wall 251. Specifically, in this embodiment, shaft 71 extends through relief 91 through left wall 251. Similarly, in this particular embodiment, right drive pulley 42 located on inboard side 232 of right wall 252 and is rotatably attached to rotatable motor shaft 72 of right motor 152 through the motor shaft relief 91 in right wall 252. Moreover, in the embodiment illustrated, left driven pulley 43 is located on inboard side 331 of left wall 251 at (e.g., concentric with) drive shaft relief 92 in left wall 251, and right driven pulley 44 is located on inboard side 232 of right wall 252 at (e.g., concentric with) drive shaft relief 92 in right wall 252. Further, in this embodiment, as used herein, left drive shaft 21 is rotatably attached to left driven pulley 43 through drive shaft relief 92 in left wall 251. Further still, left drive shaft 21 extends away from left wall 251 on outboard side 261 of left wall 251. Moreover, in this embodiment, as used herein, right drive shaft 22 is rotatably attached to right driven pulley 44 through drive shaft relief 92 in right wall 252 and extends away from right wall 252 on outboard side 262 of right wall 252. Even further, this particular embodiment includes left drive belt 31 on inboard side 331 of left wall 251. Left drive belt 31 extends around left drive pulley 41 and around left driven pulley 43 so as to rotatably connect left drive pulley 41 to left driven pulley 43. Similarly, right drive belt 32 on inboard side 232 of right wall 252 extends around right drive pulley 42 and around right driven pulley 44 so as to rotatably connect right drive pulley 42 to right driven pulley 44. Still further, in the embodiment illustrated, left side adjustable tensioner 36 is on inboard side 331 of left wall 251, and right side adjustable tensioner 37 is on inboard side 232 of right wall 252.

As mentioned, housing 25 further includes central wall 29 between left wall 251 and right wall 252. Central wall 29 is also between left drive pulley 41 and right drive pulley 42, between left driven pulley 43 and right driven pulley 44, and between left drive belt 31 and right drive belt 32, in this embodiment. Further, in this embodiment, left drive pulley 41 is supported from both left wall 251 and central wall 29 and right drive pulley 42 is supported from both right wall 252 and central wall 29. Moreover, in the embodiment illustrated, as used herein, left driven pulley 43 is supported from both left wall 251 and central wall 29 and right driven pulley 44 is supported from both right wall 252 and central wall 29. Even further, in the embodiment shown, central wall 29 is a flat plate. Still further, in this particular embodiment, left wall 251 and right wall 252 are both flat plates. Further still, in the embodiment illustrated, left wall 251, right wall 252, and central wall 29 are all parallel to each other, for example, within five degrees.

In the embodiment shown, central wall 29, left wall 251, and right wall 252 are each cut or machined from wrought or rolled metal plate (e.g., steel or aluminum), for example. In other embodiments, central wall 29, left wall 251, right wall 252, or a combination thereof, may be cast (e.g., together or separately) stamped, bent, rolled, extruded, or forged, as other examples. Further, in some embodiments, left wall 251, right wall 252, and central wall 29 (or a subset thereof) are parallel to each other within 0.25, 0.5, 1, 2, 3, 4, 5, 6, 7, 8, 9, 10, 12, 15, or 20 degrees, as examples.

Furthermore, the embodiment of housing 25 shown includes multiple joining walls 351, 352, 353, 354, 355, and 356 that (as used herein) extend from left side wall 251 to right side wall 252 and hold left side wall 251 in rigid relation to right side wall 252. See FIGS. 2, 3, and 5-7. In this embodiment, joining walls 351, 353, and 355 extend from left side wall 251 to central wall 29, and joining walls 352, 354, and 356 extend from central wall 29 to right side wall 252. In the embodiment illustrated, bolts 358 (shown in FIG. 3) extend through joining walls 351, 352, 353, 354, 355, and 356, as well as left side wall 251, right side wall 252, and central wall 29 to hold housing 25 together and in rigid relation. In other embodiments, some or all of joining walls 351, 352, 353, 354, 355, and 356 may be welded to left side wall 251, to right side wall 252, to central wall 29, or a combination thereof, as other examples.

In still other embodiments, some or all of joining walls 351, 352, 353, 354, 355, and 356, left side wall 251, right side wall 252, and central wall 29 may be cast, for example, as a single piece. In other embodiments, for example, each side wall may be cast with adjacent joining walls, forming a split casing (e.g., in two substantially symmetrical opposite halves, which may bolted together, for example, sandwiching there between a central wall (e.g., formed from a flat plate). Further, in the embodiment illustrated, the interior of housing 25 (where belts 31 and 32 are located is open to the outside between joining walls 351 and 353, 352 and 354, 353 and 355, 352 and 356, 351 and 355, and between 252 and 356. In other embodiments, these openings may be covered (e.g., with sheet metal covers) or the housing, or parts thereof, may be fabricated or cast to omit some or all such openings.

Figure 10:
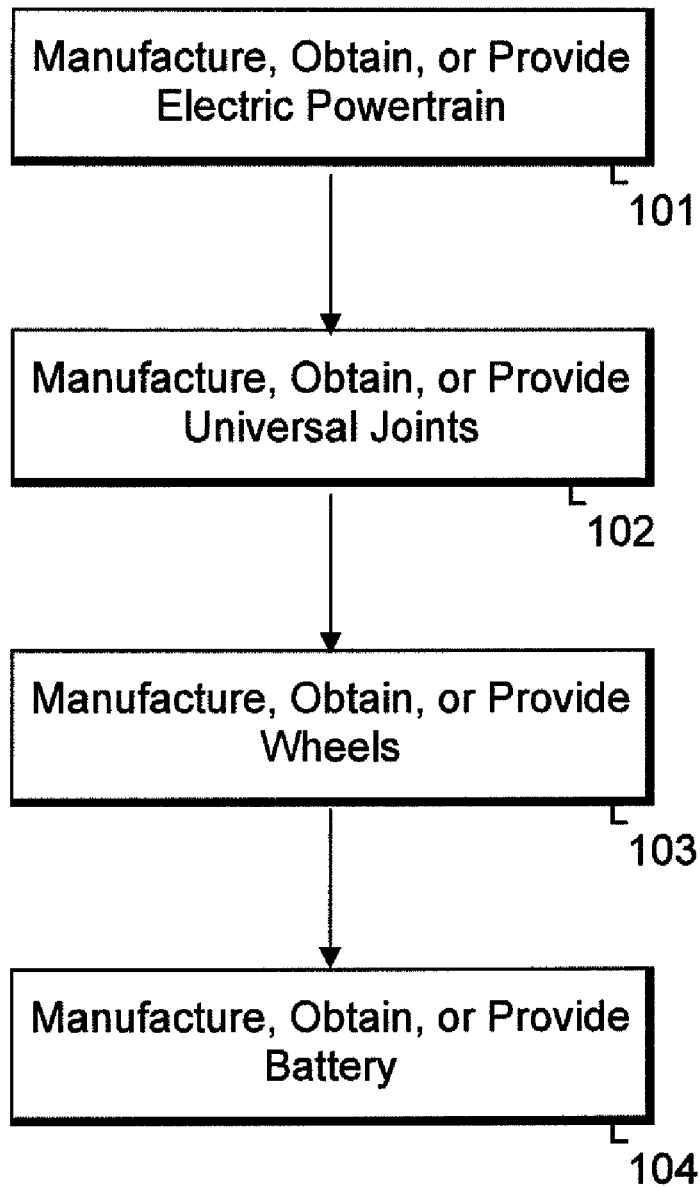
FIG. 10 is a flow chart illustrating, among other things, an example of a method of manufacturing a vehicle, for instance, having a dual belt drive.

Still other embodiments include a number of methods, for example, of manufacturing a vehicle. Method 100 in FIG. 10 is an example of such a method. Various methods may include, for example, in the order indicated here, or in another order, at least certain acts. Different embodiments include different combinations of the acts illustrated in method 100, other acts described herein, or other acts known in the art. Method 100, in the embodiment illustrated, includes, for example, act 101 of manufacturing, obtaining, or providing an electric powertrain (e.g., 15 described herein). Such a powertrain (e.g., 15) may include, for example, various structure described herein such as a housing (e.g., 25) including, for instance, a left wall (e.g., 251) and a right wall (e.g., 252). The left wall (e.g., 251) may have an inboard side (e.g., 331) facing the right wall (e.g., 252) and an outboard side (e.g., 261) facing away from the right wall (e.g., 252). Further, the right wall (e.g., 252) may have an inboard side (e.g., 232) facing the left wall (e.g., 251) and an outboard side (e.g., 262) facing away from the left wall (e.g., 251). In a number of embodiments, the left wall (e.g., 251) and the right wall (e.g., 252) each have a motor shaft hole (e.g., motor shaft relief 91 shown in FIG. 9) and a drive shaft hole (e.g., drive shaft relief 92), for example.

Further, such a powertrain (e.g., 15) may include a left electric motor (e.g., 151), for example, mounted on the outboard side (e.g., 261) of the left wall (e.g., 251) at the motor shaft hole (e.g., relief 91) in the left wall (e.g., 251) and having a rotatable motor shaft (e.g., 71). Similarly a number of embodiments include a right electric motor (e.g., 152), for instance, mounted on the outboard side (e.g., 262) of the right wall (e.g., 252) at the motor shaft hole (e.g., relief 91) in the right wall (e.g., 252) and having a rotatable motor shaft (e.g., 72).

Moreover, such a powertrain (e.g., 15) may include a left drive pulley (e.g., 41) located on the inboard side (e.g., 331) of the left wall (e.g., 251) and rotatably attached to the rotatable motor shaft (e.g., 71) of the left motor (e.g., 151) through the motor shaft hole (e.g., relief 91) in the left wall (e.g., 251). Further, such a powertrain (e.g., 15) may include a right drive pulley (e.g., 42) located on the inboard side (e.g., 232) of the right wall (e.g., 252) and rotatably attached to the rotatable motor shaft (e.g., 72) of the right motor (e.g., 152) through the motor shaft hole (e.g., relief 91) in the right wall (e.g., 252). Still further, various embodiments may include a left driven pulley (e.g., 43) located on the inboard side (e.g., 331) of the left wall (e.g., 251) at the drive shaft hole (e.g., relief 92) in the left wall (e.g., 251), and a right driven pulley (e.g., 44) located on the inboard side (e.g., 232) of the right wall (e.g., 252) at the drive shaft hole (e.g., relief 92) in the right wall (e.g., 252). In a number of embodiments, left driven pulley 43 and right driven pulley 44 may have a common centerline, for example. Even further still, such a powertrain (e.g., 15) may include a left drive shaft (e.g., 21), for example, rotatably attached to left driven pulley 43 through the drive shaft hole (e.g., relief 92) in the left wall (e.g., 251) and extending away from the left wall (e.g., 251) on the outboard side (e.g., 261) of the left wall (e.g., 251). Such a drivetrain (e.g., 15) may further include a right drive shaft (e.g., 22), for instance, rotatably attached to right driven pulley 44 through the drive shaft hole (e.g., relief 92) in the right wall (e.g., 252) and extending away from the right wall (e.g., 252) on the outboard side (e.g., 262) of the right wall (e.g., 252).

Furthermore, such a powertrain (e.g., 15) obtained or provided in such a method (e.g., 100, for instance, in act 101) may further include a left drive belt (e.g., 31) on the inboard side (e.g., 331) of the left wall (e.g., 251) and extending around left drive pulley 41 and extending around left driven pulley 43 so as to rotatably connect left drive pulley 41 to left driven pulley 43. Similarly, such a powertrain (e.g., 15) may include a right drive belt (e.g., 32) on the inboard side (e.g., 232) of the right wall (e.g., 252) and extending around right drive pulley 42 and extending around right driven pulley 44 so as to rotatably connect right drive pulley 42 to right driven pulley 44. Additionally, in such embodiments, the powertrain (e.g., 15) may include a central wall (e.g., 29) between the left wall (e.g., 251) and the right wall (e.g., 252). In a number of embodiments, for example, central wall 29 is between left drive pulley 41 and right drive pulley 42, central wall 29 is between left driven pulley 43 and right driven pulley 44, and central wall 29 is between left drive belt 31 and right drive belt 32. Moreover, in a number of such embodiments, left driven pulley 43 is supported (e.g., as described herein) from both the left wall (e.g., 251) and central wall 29, and right driven pulley 44 is supported from both the right wall (e.g., 252) and central wall 29.

Still further, in a number of such methods (e.g., 100), the electric powertrain (e.g., 15) may include a left side adjustable tensioner (e.g., 36), for example, on the inboard side (e.g., 331) of the left wall (e.g., 251), that adjustably presses a tensioner pulley (e.g., 38) against left drive belt 31 between left drive pulley 41 and left driven pulley 43. Similarly, such a powertrain (e.g., 15) may include a right side adjustable tensioner (e.g., 37), for instance, on the inboard side (e.g., 232) of the right wall (e.g., 252), that adjustably presses a tensioner pulley (e.g., 39) against right drive belt 32 between right drive pulley 42 and right driven pulley 44. Such a powertrain (e.g., 15) may further include multiple joining walls (e.g., 351-356, as shown in FIG. 3) extending from the left side wall (e.g., 251) to the right side wall (e.g., 252), for example, and holding the left side wall (e.g., 251) in rigid relation to the right side wall (e.g., 252).

Even further, in the embodiment illustrated, method 100 further includes act 102 of manufacturing, obtaining, or providing universal joints (e.g., constant velocity joints) in the drive shafts. For example, in act 102, two universal joints (e.g., 23 and 27) may be provided in the left drive shaft (e.g., 21), and two universal joints (e.g., 24 and 28) may be provided in the right drive shaft (e.g., 22). Further still, method 100, in the embodiment shown, includes act 103 of manufacturing, obtaining, or providing various wheels (e.g., road wheels of vehicle 10). For example, act 103 may include manufacturing, obtaining, or providing a left first wheel (e.g., 11 shown in FIG. 1), for example, rotatably attached to the left drive shaft (e.g., 21) at a first end (e.g., 191, for example, the front) of the vehicle (e.g., 10), and a right second wheel (e.g., 12), for instance, rotatably attached to the right drive shaft (e.g., 22) at the first end (e.g., 191) of the vehicle (e.g., 10). Further still, in some embodiments, act 103 may include manufacturing, obtaining, or providing a left third wheel (e.g., 13) at a second end (e.g., 192, for example, the rear) of the vehicle (e.g., 10), and a right fourth wheel (e.g., 14) at the second end (e.g., 192) of the vehicle (e.g., 10). Moreover, in the embodiment illustrated, method 100 further includes act 104 of manufacturing, obtaining, or providing a battery (e.g., 16 shown in FIG. 1) powering the left electric motor (e.g., 151) and the right electric motor (e.g., 152).

Various methods may further include acts of manufacturing, obtaining, providing, or making various components described herein or known in the art. Various methods in accordance with different embodiments include acts of selecting, making, positioning, or using certain components, as examples. Other embodiments may include performing other of these acts on the same or different components, or may include fabricating, assembling, manufacturing, obtaining, providing, ordering, receiving, shipping, or selling such components, or other components described herein or known in the art, as other examples. Further, various embodiments include various combinations of the components, features, and acts described herein or shown in the drawings, for example. Further, particular embodiments include various means for accomplishing one or more of the particular functions described herein or apparent from the structure described. Other embodiments may be apparent to a person of ordinary skill in the art having studied this document.

What is claimed is:

1. An electric vehicle powertrain comprising:
    a housing comprising a left wall and a right wall, the left wall having an inboard side facing the right wall and an outboard side facing away from the right wall, and the right wall having an inboard side facing the left wall and an outboard side facing away from the left wall, wherein the left wall and the right wall each have a motor shaft relief and a drive shaft relief;
    a left electric motor mounted on the outboard side of the left wall at the motor shaft relief in the left wall and having a rotatable motor shaft;
    a right electric motor mounted on the outboard side of the right wall at the motor shaft relief in the right wall and having a rotatable motor shaft;
    a left drive pulley located on the inboard side of the left wall and rotatably attached to the rotatable motor shaft of the left motor through the motor shaft relief in the left wall;
    a right drive pulley located on the inboard side of the right wall and rotatably attached to the rotatable motor shaft of the right motor through the motor shaft relief in the right wall;

a left driven pulley located on the inboard side of the left wall at the drive shaft relief in the left wall;

a right driven pulley located on the inboard side of the right wall at the drive shaft relief in the right wall;

a left drive shaft rotatably attached to the left driven pulley through the drive shaft relief in the left wall and extending away from the left wall on the outboard side of the left wall;

a right drive shaft rotatably attached to the right driven pulley through the drive shaft relief in the right wall and extending away from the right wall on the outboard side of the right wall;

a left drive belt on the inboard side of the left wall and extending around the left drive pulley and extending around the left driven pulley so as to rotatably connect the left drive pulley to the left driven pulley; and a right drive belt on the inboard side of the right wall and extending around the right drive pulley and extending around the right driven pulley so as to rotatably connect the right drive pulley to the right driven pulley;

wherein:
the housing further comprises a central driven pulley support located between the left driven pulley and the right driven pulley;
the left driven pulley is supported from both the left wall and the central driven pulley support and
the right driven pulley is supported from both the right wall and the central driven pulley support.

2. The electric powertrain of claim 1 wherein:
the housing further comprises a central wall between the left wall and the right wall;
the central wall is between the left drive pulley and the right drive pulley;
the central wall is between the left driven pulley and the right driven pulley; and
the central wall is between the left drive belt and the right drive belt.

3. The electric powertrain of claim 1 further comprising:
a left side adjustable tensioner on the inboard side of the left wall that adjustably presses a tensioner pulley against the left drive belt between the left drive pulley and the left driven pulley; and
a right side adjustable tensioner on the inboard side of the right wall that adjustably presses a tensioner pulley against the right drive belt between the right drive pulley and the right driven pulley.

4. The electric powertrain of claim 1 further comprising multiple joining walls extending from the left side wall to the right side wall and holding the left side wall in rigid relation to the right side wall.

5. The electric powertrain of claim 1 wherein the left drive pulley and the right drive pulley have a common centerline and wherein the transmission housing further comprises a central drive pulley support located between the left drive pulley and the right drive pulley, wherein the central drive pulley support comprises a central drive pulley pin that extends to the left drive pulley and to the right drive pulley to support the left drive pulley and the right drive pulley.

6. The electric powertrain of claim 1 wherein the left driven pulley and the right driven pulley have a common centerline and wherein the central driven pulley support comprises a central driven pulley pin that extends to the left driven pulley and to the right driven pulley to support the left driven pulley and the right driven pulley.

7. The electric powertrain of claim 2 wherein the left drive pulley is supported from both the left wall and the central wall and the right drive pulley is supported from both the right wall and the central wall.

8. The electric powertrain of claim 2 wherein the left driven pulley is supported from both the left wall and the central wall and the right driven pulley is supported from both the right wall and the central wall.

9. The electric powertrain of claim 2 wherein the central wall is a flat plate.

10. The electric powertrain of claim 2 wherein the left wall, the right wall, and the central wall are all parallel to each other within five degrees.

11. A highway vehicle comprising:
a single, centrally-located transmission housing containing therein;
a left drive pulley;
a right drive pulley;
a left driven pulley;
a right driven pulley;
a left drive belt extending around the left drive pulley and extending around the left driven pulley so as to rotatably connect the left drive pulley to the left driven pulley; and
a right drive belt extending around the right drive pulley and extending around the right driven pulley so as to rotatably connect the right drive pulley to the right driven pulley;
a left electric motor rotatably attached to the left drive pulley;
a right electric motor rotatably attached to the right drive pulley;
a left drive shaft rotatably attached to the left driven pulley and extending outside of the transmission housing, wherein the left drive shaft comprises at least one universal joint outside of the transmission housing;
a right drive shaft rotatably attached to the right driven pulley and extending outside of the transmission housing, wherein the right drive shaft comprises at least one universal joint outside of the transmission housing;
a left wheel rotatably attached to the left drive shaft; and
a right wheel rotatably attached to the right drive shaft;
wherein: the transmission housing further comprises a central wall; the central wall is between the left drive pulley and the right drive pulley; the left drive pulley is supported from the central wall; and the right drive pulley is supported from the central wall.

12. The highway vehicle of claim 11 wherein:
the transmission housing has an outside surface;
the left electric motor is mounted on the outside surface of the transmission housing; and
the right electric motor is mounted on the outside surface of the transmission housing.

13. The highway vehicle of claim 11 wherein:
the left drive shaft comprises a left decoupler; and
the right drive shaft comprises a right decoupler.

14. The highway vehicle of claim 11 wherein the left wheel and the right wheel are a first wheel and a second wheel at a first end of the vehicle, and wherein the vehicle further comprises a third wheel and a fourth wheel at a second end of the vehicle and an internal combustion engine driving the third wheel and the fourth wheel.

15. The highway vehicle of claim 11 further comprising a battery powering the left electric motor and the right electric motor.

16. The highway vehicle of claim 11 further comprising a central drive pulley pin that extends to the left drive pulley and to the right drive pulley to support the left drive pulley and the right drive pulley.

17. The highway vehicle of claim 11 wherein:
the central wall is between the left driven pulley and the right driven pulley;
the central wall is between the left drive belt and the right drive belt;
the left driven pulley is supported from the central wall; and
the right driven pulley is supported from the central wall.

18. The highway vehicle of claim 11 further comprising:
a left side adjustable tensioner that adjustably presses a tensioner pulley against the left drive belt between the left drive pulley and the left driven pulley; and
a right side adjustable tensioner that adjustably presses a tensioner pulley against the right drive belt between the right drive pulley and the right driven pulley.

19. The highway vehicle of claim 11 further comprising a central driven pulley pin that extends to the left driven pulley and to the right driven pulley to support the left driven pulley and the right driven pulley wherein the left driven pulley and the right driven pulley have a common centerline.

20. A method of manufacturing a vehicle, the method comprising in any order at least the acts of:
manufacturing, obtaining, or providing an electric powertrain comprising:
a housing comprising a left wall and a right wall, the left wall having an inboard side facing the right wall and an outboard side facing away from the right wall, and the right wall having an inboard side facing the left wall and an outboard side facing away from the left wall, wherein the left wall and the right wall each have a motor shaft hole and a drive shaft hole;
a left electric motor mounted on the outboard side of the left wall at the motor shaft hole in the left wall and having a rotatable motor shaft;
a right electric motor mounted on the outboard side of the right wall at the motor shaft hole in the right wall and having a rotatable motor shaft;
a left drive pulley located on the inboard side of the left wall and rotatably attached to the rotatable motor shaft of the left motor through the motor shaft hole in the left wall;
a right drive pulley located on the inboard side of the right wall and rotatably attached to the rotatable motor shaft of the right motor through the motor shaft hole in the right wall;
a left driven pulley located on the inboard side of the left wall at the drive shaft hole in the left wall;
a right driven pulley located on the inboard side of the right wall at the drive shaft hole in the right wall, wherein the left driven pulley and the right driven pulley have a common centerline;
a left drive shaft rotatably attached to the left driven pulley through the drive shaft hole in the left wall and extending away from the left wall on the outboard side of the left wall;
a right drive shaft rotatably attached to the right driven pulley through the drive shaft hole in the right wall and extending away from the right wall on the outboard side of the right wall;
a left drive belt on the inboard side of the left wall and extending around the left drive pulley and extending around the left driven pulley so as to rotatably connect the left drive pulley to the left driven pulley;
a right drive belt on the inboard side of the right wall and extending around the right drive pulley and extending around the right driven pulley so as to rotatably connect the right drive pulley to the right driven pulley;
a central wall between the left wall and the right wall wherein:
the central wall is between the left drive pulley and the right drive pulley;
the central wall is between the left driven pulley and the right driven pulley;
the central wall is between the left drive belt and the right drive belt;
the left driven pulley is supported from both the left wall and the central wall;
the right driven pulley is supported from both the right wall and the central wall;
a left side adjustable tensioner on the inboard side of the left wall that adjustably presses a tensioner pulley against the left drive belt between the left drive pulley and the left driven pulley;
a right side adjustable tensioner on the inboard side of the right wall that adjustably presses a tensioner pulley against the right drive belt between the right drive pulley and the right driven pulley; and
multiple joining walls extending from the left side wall to the right side wall and holding the left side wall in rigid relation to the right side wall;
manufacturing, obtaining, or providing two universal joints in the left drive shaft and two universal joints in the right drive shaft;
manufacturing, obtaining, or providing:
a left first wheel rotatably attached to the left drive shaft at a first end of the vehicle;
a right second wheel rotatably attached to the right drive shaft at the first end of the vehicle;
a left third wheel at a second end of the vehicle; and
a right fourth wheel at the second end of the vehicle; and
manufacturing, obtaining, or providing a battery powering the left electric motor and the right electric motor.

\* \* \* \* \*